March 8, 1960 R. SCHULZE 2,928,044
RECORDING MAGNETOMETER
Filed Dec. 9, 1957 2 Sheets-Sheet 1
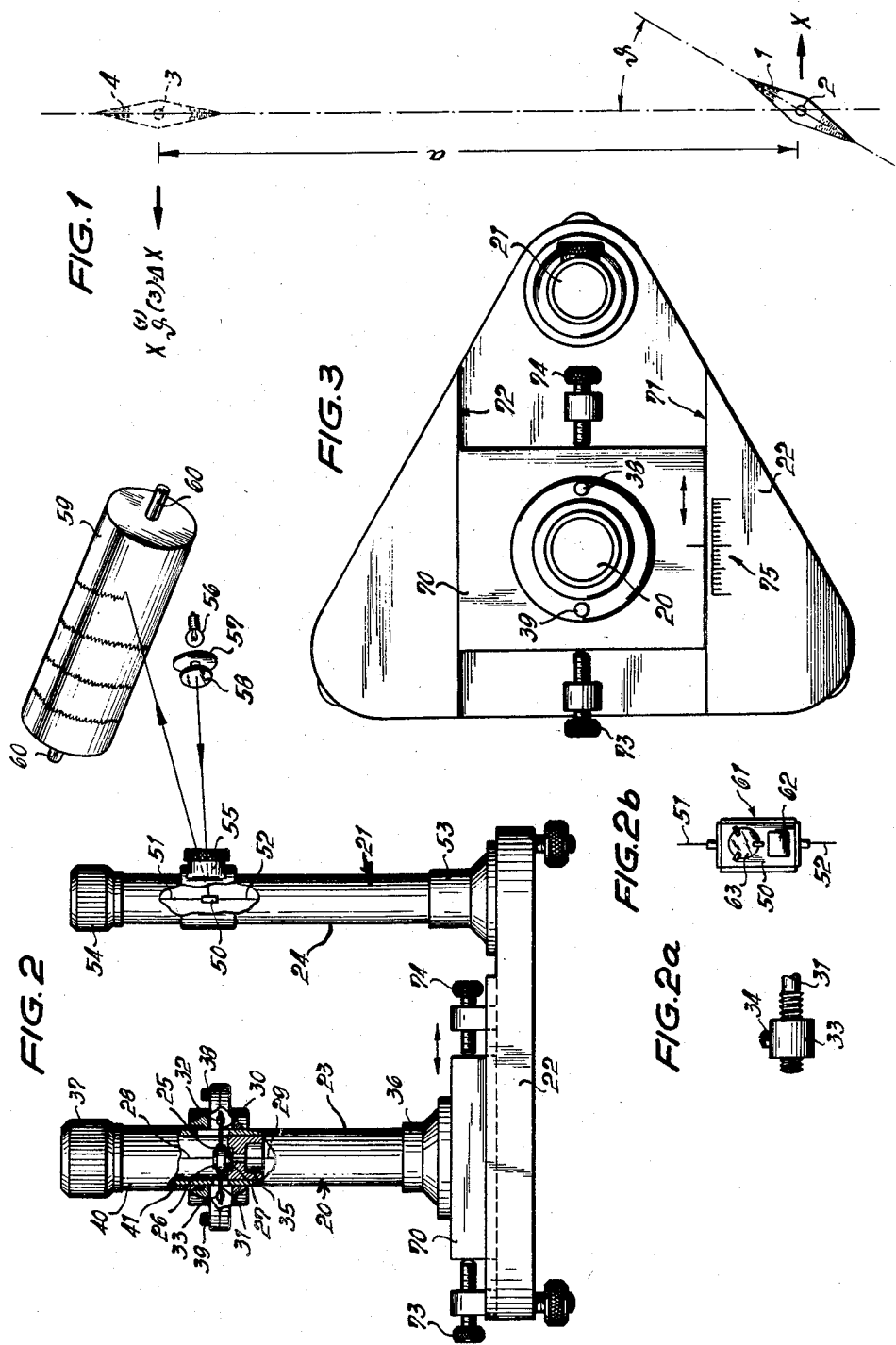

March 8, 1960 R. SCHULZE 2,928,044
RECORDING MAGNETOMETER
Filed Dec. 9, 1957 2 Sheets-Sheet 2
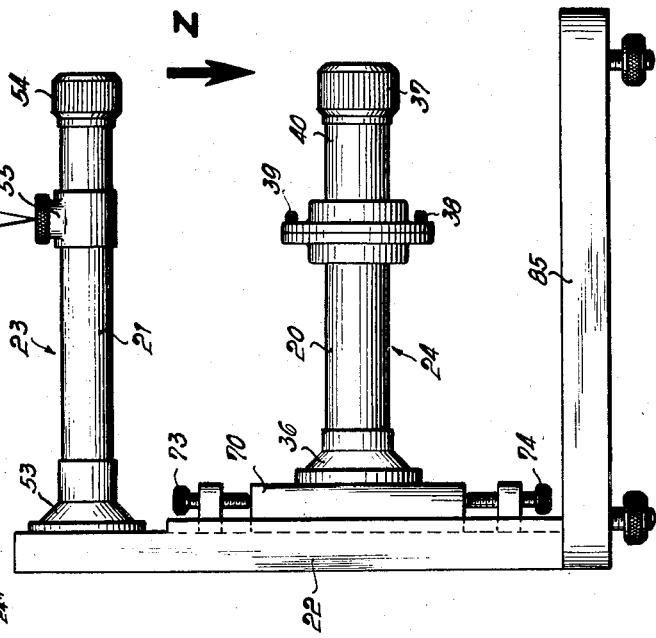
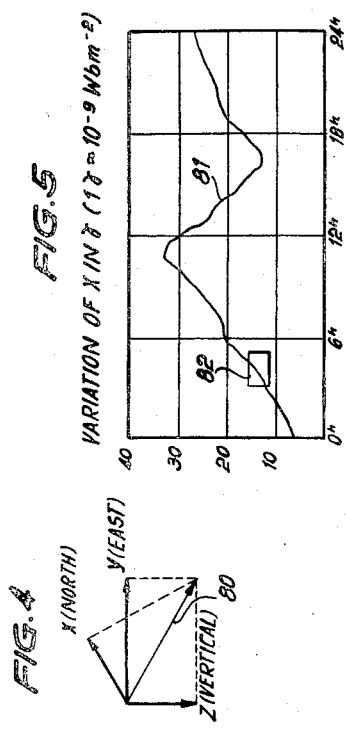
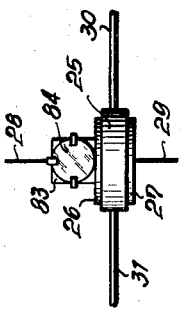

United States Patent Office 2,928,044
Patented Mar. 8, 1960

2,928,044

RECORDING MAGNETOMETER

Reinhard Schulze, Berlin-Friedenau, Germany, assignor to Askania-Werke A.G., Berlin-Friedenau, Germany, a corporation of Germany Application December 9, 1957, Serial No. 701,389

Claims priority, application Germany December 9, 1956

8 Claims. (Cl. 324—48)

This invention relates to magnetometers of the recording type and particularly to an instrument of this kind which records not only slow or gradual variations of a changeable magnetic field, such as the geomagnetic field, but also rapid variations or pulsations, superimposed over the slow changes in relatively short periods.

Prior magnetometer recorders, mainly for geophysical observatories currently recording the temporal variations of the geomagnetic field, have been developed, for instance by La Cour and Schmidt. It is typical for their operation and construction that, when sensitive and detailed response to rapid variations is obtained, a recording light pencil frequently reaches and passes one margin of a record strip, whereupon a new light pencil has to be introduced at the opposite margin. This involves certain problems of construction and additionally involves a type of recording which is incoherent so that it can be utilized only with difficulties. Moreover the mass of record material obtained by such operation is enormous, large areas of most record strips being unused as they must be provided only for potential utilization in the combined recording of slow and fast oscillations. It is a primary object of this invention to eliminate such problems, incoherencies and wasteful records.

Devices have been proposed whereby both slow and superimposed fast variations can be recorded as continuous graphs by a method which, as a matter of principle, involves subtractively eliminating the slow variations from the measurements, so that in the end, the pulsations are isolated, which can then be recorded suitably, for instance photographically. It has been found, however, that the complication and expenses are substantial, even in the use of such devices; particularly when several or all of the field components must be recorded. It is therefore a further object of this invention to eliminate also these further complications and costs.

The objects have been achieved by combining the recording magnetometer with an auxiliary, suitably spaced magnet system, the field of which so influences the variable field to be measured that the latter only exhibits the rapid pulsations. Desirably the auxiliary system comprises a magnet which can turn about an axis parallel to that of the pulsation recording magnet. The preferred arrangement of these axes to the field to be measured will be explained hereinafter, together with other detailed features of the invention.

Figure 1 is a schematic diagram which serves to explain the basic principle of the invention. Figure 2 is a side view, partly in elevation and partly in perspective, of a simple device incorporating the invention and recording the horizontal field strength or one of the components thereof. Figures 2a and 2b are greatly enlarged details from Figure 2. Figure 3 is a plan view of the apparatus of Figure 2. Figure 4 shows the several components of the force to be measured. Figure 5 illustrates a measurement of geomagnetism, as heretofore obtained by instruments of relatively low sensitivity. Figure 6 illustrates a portion of such a measurement, as heretofore obtained by instruments of relatively higher sensitivity. Figure 7 is an enlarged detail similar to Figure 2b but showing a slight modification of a part from Figure 2. Figure 8 is a view generally similar to Figure 2 but showing a device recording the vertical field strength or a component thereof.

In Figure 1 the auxiliary system is schematically shown as compass needle 1 rotatable about axis 2, while the recording system, here to be used for recording only the rapid pulsations, is shown as a similar needle 4 on axis 3 spaced from axis 2 and parallel thereto. In the absence of any geophysical and other external field, the permanent magnetism of needles 1 and 4 would cause these needles to orient themselves in parallel directions normal to the line interconnecting the centers of the needles. Actually, however, the presence of the external field urges both needles into different orientations and particularly into orientations which vary upon variations of either angularity or strength of the external field. As shown in the drawing, the line interconnecting centers 2 and 3 is arranged transversely of the field component X to be measured and at a predetermined, desirably right angle thereto; the component X being for instance, as indicated by Figure 4, the component of field force 80 which is measured along an axis pointing north. (It will be understood that the axes X, Y, Z are normal to one another, axis Y pointing east and Z vertically down.)

Figure 1 shows the system upon a variation $\Delta X$ of the external field, as a result of which variation the auxiliary needle 1 and the line 3—2 include an angle $\vartheta$. According to the invention the mass, damping and related characteristics of needle 1 are such that said needle cannot immediately follow the rapid pulsations of the external field but can react only gradually thereto and accordingly move only in response to the slower, so-called normal variations, whereas the corresponding characteristics of the recording needle 4 are such that it can accurately follow each rapid pulsation. The magnetic moment M of the auxiliary and slow needle 1 is desirably greater, and preferably several times greater than that of the fast needle 4.

By means of these features it is possible for each location to determine a distance $a$ from 2 to 3 of such length that at 3 the component $X_a^{(1)}(3)$, which equals $$\frac{M}{a^3} \sin \vartheta$$

also equals (fully compensates) the variation $\Delta X$ of the external field, as indicated in Figure 1.

Heretofore, when a needle or magnet of low sensitivity was used, the recording which showed for instance the temporal variations of horizontal component X had in principle a form such as that of curve 81 in Figure 5, which failed to indicate the rapid pulsations. On the other hand, when the sensitivity was such as to record the rapid pulsations, schematically shown at 81′ in Figure 6, unit areas of the chart—shown at 82 in Figure 5—had to be made so large that the slower variations caused the curve 81 to go beyond the margins of the record strip, that is, beyond the horizontal lines at top and bottom of Figure 5. This caused the initially mentioned, incoherent recording and waste of record strip material.

According to the invention, by contrast, a record of rapid pulsations of needle 4 follows a horizontal base line, instead of following a more or less inclined curve 81 and, on the other hand, a record derived from the slow oscillations of needle 1 need not reflect the rapid pulsations even if the instrument has high sensitivity. Both records are in form of coherent, uninterrupted lines. It will be understood that the exact shape of such lines will vary with the amplitude and frequency of the slow and fast variations of the different field components. Typical amplitudes of the slow variations range between 10 and 35 times $10^{-9}$ weber/square meter for the $x$ and $z$ components, in central Europe, and between .1 and .2 degree for the declination of the $y$ component, whereas typical amplitudes of the fast variations range between .10 and 500 times $10^{-9}$ weber/square meter and between .010 and several degrees for the corresponding components, subject, of course to great local and temporal changes. When such variations reach amplitudes comparable to or greater than those of the slow fluctuations, they are sometimes referred to as magnetic storms. According to the invention, both severe storms and most gentle variations can be recorded coherently and accurately, by means and procedures of relative simplicity.

The principles explained above can be realized in many different forms. A preferred embodiment is shown in Figures 2 and 3, where numeral 20 designates a magnetometer element which records only the slow variations of the external field, while numeral 21 represents the pulsation measuring element. Both elements are mounted vertically on a base plate 22, the instrument being intended to measure horizontal component X or Y. Each element comprises a non-ferrous housing 23 or 24 and the slow magnetometer housing 23 has an aluminum body 25 suspended therein, with magnets 26, 27 on the top and bottom surfaces thereof to provide the slow-acting magnet system. The suspension is provided by torsion wires 28, 29 connected respectively to the top and bottom magnets. For the enhancement and adjustment of the inertial moment of the slow magnet system the aluminum body 25 has arms 30, 31 extending from the sides thereof, in opposite, horizontal directions, with shiftable weights 32, 33 on said arms. As shown in Figure 2a, the weights may for instance engage threaded ends of the arms and may be secured in place by screws 34. Damping of the oscillations of the slow system 25, 26, 27 may be provided by a copper plate member 35 having a top surface adjacent the bottom surface of magnet 27; this member being fitted into housing 23 by a suitable flange.

The sensitive, pulsation recording system 21 is rigidly secured to the base plate 22 and provided with a magnet system 50 suspended on torsion wires 51, 52, said wires being suitably secured to the top 54 and foot 53 of housing 24, respectively. The system 50 is shown in detail in Figure 2b. It comprises a thin, vertical aluminum plate 61 having the wires 51, 52 secured thereto. This body 61 carries the magnet 62 and a mirror 63. As indicated in Figure 2 a window 55 in housing 24, opposite system 50, admits a light ray generated by source 56, pinpoint aperture member 57 and lens 58. The light ray is reflected by mirror 63, whereupon it passes through window 55 again and reaches a light-sensitive record 59 which may for instance be supported on a drum rotating on shaft 60.

The instrument can be adjusted for high sensitivity and effectiveness in accordance with the local conditions as to temporal changes of the geomagnetic field, which conditions vary from place to place, not only from time to time. It is important, among other things, that the damping and/or the inertial moment of the slow system 20 be adjusted to the proper value, in order that, on the one hand, the rapid pulsations be safely prevented from influencing this system and that, on the other hand, the slow variations be reflected promptly and sensitively. For this purpose provision is made for re-adjusting the position of weights 32, 32 on arms 30, 31, without disturbance of the suspension system 28, 29 secured to the top and bottom of the housing 23. For instance, as shown in Figure 2, the arms 30, 31 may extend from within this housing 23, through openings in the sidewalls thereof, into chambers formed in flange members outwardly extending from said sidewalls, the lower flange member being fast on the bottom part 36 of the housing and the upper flange member being removably secured to the lower one by bolts 38, 39, so that the flange chambers and the weights 32, 33 therein can be exposed. Desirably the upper flange member has an outer shell 40 of the top part of the housing 23 secured thereto, which carries an independently rotatable knob 37, this knob in turn being adapted by well-known mechanism, not shown, to adjust the tension of the threads 28, 29 depending from the top 41 of the inner housing 23. Adjustment of knob 37 and of the tension of the threads, controlled thereby, insures the proper elastic reaction of the system on application of a certain amplitude of field variation, while adjustment of weights 32, 33, as mentioned, influences the characteristic frequency of the system.

No adjustment of frequency is generally required for the most sensitive element 21, but adjustment of tension, similar to that provided in 20 by knob 37, may here be provided by a similar knob 54. The suspension thread of course is anchored at the bottom 53.

As indicated above, it is necessary also to provide a distance $a$ (Figure 1) corresponding with certain local characteristics of the field to be measured. For this purpose the element 20 may be mounted on a sub-base 70, best shown in Figure 3, which is slidable between rigid jaws 71, 72 on base 22, under the control of setscrews 73, 74; the adjustment being readable on a scale 75.

While the auxiliary mechanism 20 provided according to the invention serves primarily to provide an auxiliary field to influence the recording mechanism 21, this auxiliary mechanism may also serve recording purposes by itself; that is, it may be used to record the slow variations. For this purpose a window similar to that shown at 55 may be provided in the walls 40, 41 and the system 25, 26, 27, as shown in Figure 7, may be provided with a rigid, upstanding plate 83 carrying a suitable mirror 84. Of course the system 20 must then be provided also with suitable illuminating and recording means, similar to those shown at 56 to 60.

It will be understood that the entire instrument is desirably protected from changes of temperature and the like, so far as possible. It is further desirable to utilize suspension threads 28, 29 and 51, 52 which have uniform thermoelastic behavior. Preferably both systems may utilize the compensation of thermomagnetic variations by thermoelastic variations as disclosed in the patent of Haalck 2,760,154.

The operation of the instrument is believed to be evident from the explanations which have already been given and from principles generally known. It will be understood that, in order to measure all field components, three systems 20, 21 are generally required, which may best be disposed at considerable distances from one another in order to prevent mutual interferences other than those desired in accordance with the invention. Assuming for instance that the instrument of Figures 2 and 3 serves to measure the component X, Figure 4, the line intersecting the centers of 20 and 21 must be arranged transversely of the X axis and desirably in East-West orientation, in order to secure maximum sensitivity.

Correspondingly, for measuring the Y component, a similarly constructed instrument, which however usually requires different adjustment of tension etc., should be oriented along the North-South axis. For measuring the vertical or Z component, a slightly modified instrument is shown in Figure 8, wherein the base 22 is vertically mounted on a support plate 85. If element 20 be located in the plane of the drawing, in this view, the other element 21 is desirably located behind that plane in order to insure the transversal mounting mentioned above. In fact it may be preferred to modify the arrangement and to make the line intersecting the centers of 20, 21 normal to the vertical component Z, in order to obtain maximum sensitivity. It is also possible to combine two or three instruments of the types shown in Figures 2 and 8, on a single base, and still to minimize undesired cross-interference by suitable positioning of the different magnets. Many other modifications are possible; for instance the recording may be effected with the aid of a photoelectrical transducer or the like. It is also possible to use the system for the recording of magnetic fields other than that of the earth.

In all applications the cost of construction and operation is considerably lower than in instruments heretofore used or proposed, while the accuracy and sensitivity need not be limited. Heretofore, the recording of each component required the use of two complete recording instruments, or at least the use of one such instrument together with a complex system of galvanometers or the like, and/or the use of incoherent records. The use of an auxiliary magnet, as provided herein, simplifies the construction, as well as the operation of the instrument to a large extent.

I claim:

1. In a recording magnetometer, a magnetic measuring system mounted for sensitive response to variations of an external field by rotation about an axis; a mirror on said system for deflecting a light ray in response to said rotation; and an auxiliary magnetic system mounted for slow response to variations of said field by rotation about an axis which is parallel to the first-mentioned axis and is so spaced therefrom transversely of said field that the field of the auxiliary system, upon each slow response, fully compensates, at the measuring system, those of said variations which have effected said slow response.

2. A magnetometer as described in claim 1 wherein the auxiliary system has a magnetic moment exceeding that of the measuring system.

3. A magnetometer as described in claim 2 wherein the moment of the auxiliary system equals several times that of the measuring system.

4. In an instrument for recording characteristics, including rapid variations, of the geomagnetic field, a magnet mounted for sensitive response to rapid variations of said field by rotation about an axis; means for measuring said rotation; an auxiliary magnet mounted for response to slow variations of said field by rotation about an axis parallel to the first-mentioned axis and spaced therefrom; and means for making the response of the auxiliary magnet sufficiently slow to fully compensate, in the sensitive response of the first-mentioned magnet, the slow variations of said field to which the auxiliary magnet responds.

5. An instrument as described in claim 4 wherein said parallel axes are spaced apart transversely of the filed to be recorded.

6. An instrument as described in claim 5 wherein said parallel axes are spaced apart substantially at right angles to said field.

7. An instrument as described in claim 4 comprising means for adjusting the spacing of said axes.

8. An instrument as described in claim 4 comprising means for measuring the rotation of the auxiliary magnet.

References Cited in the file of this patent

UNITED STATES PATENTS

| | | |
|---|---|---|
| 1,701,603 | Bauer et al. | Feb. 12, 1929 |
| 2,501,538 | Ruska | Mar. 21, 1950 |
| 2,590,184 | Koulomzine | Mar. 25, 1952 |
| 2,590,979 | Kogbetliantz | Apr. 1, 1952 |
| 2,656,505 | Hewitt | Oct. 20, 1953 |
| 2,760,154 | Haalck | Aug. 21, 1956 |